United States Patent
Kasuya

(10) Patent No.: US 7,769,962 B2
(45) Date of Patent: Aug. 3, 2010

(54) SYSTEM AND METHOD FOR THREAD CREATION AND MEMORY MANAGEMENT IN AN OBJECT-ORIENTED PROGRAMMING ENVIRONMENT

(75) Inventor: Atsushi Kasuya, Sunnyvale, CA (US)

(73) Assignee: Jeda Technologies, Inc., Santa Clara, CA (US)

( * ) Notice: Subject to any disclaimer, the term of this patent is extended or adjusted under 35 U.S.C. 154(b) by 377 days.

(21) Appl. No.: 11/775,767

(22) Filed: Jul. 10, 2007

(65) Prior Publication Data

US 2008/0010432 A1 Jan. 10, 2008

Related U.S. Application Data

(63) Continuation-in-part of application No. 11/301,482, filed on Dec. 12, 2005, now abandoned.

(60) Provisional application No. 60/830,162, filed on Jul. 10, 2006.

(51) Int. Cl.
*G06F 12/00* (2006.01)
(52) U.S. Cl. .................. 711/153; 711/147; 711/162; 711/206; 718/104

(58) Field of Classification Search .............. None
See application file for complete search history.

(56) References Cited

U.S. PATENT DOCUMENTS

| | | | |
|---|---|---|---|
| 6,247,027 B1 * | 6/2001 | Chaudhry et al. | 707/206 |
| 6,862,674 B2 * | 3/2005 | Dice et al. | 711/170 |
| 6,907,437 B1 * | 6/2005 | Trotter | 707/206 |
| 7,447,829 B2 * | 11/2008 | Wilding et al. | 711/1 |
| 2002/0095453 A1 * | 7/2002 | Steensgaard | 709/107 |
| 2003/0229766 A1 * | 12/2003 | Dice et al. | 711/154 |
| 2005/0086658 A1 * | 4/2005 | Wilding et al. | 718/104 |

* cited by examiner

*Primary Examiner*—Kevin Verbrugge
(74) *Attorney, Agent, or Firm*—Venture Pacific Law, PC

(57) ABSTRACT

A system and a method for thread creation where only copied threads share the same stack location for execution, so unrelated threads have individual stack space and can be executed concurrently in multi-processor system. Also, the copy operation of the stack frame is only necessary among the copied threads, so the speed of context switching among individual threads is fast. This operation can be a simple page table modification in the virtual memory management mechanism for further speed up.

3 Claims, 8 Drawing Sheets

SYSTEM AND METHOD FOR THREAD CREATION AND MEMORY MANAGEMENT IN AN OBJECT-ORIENTED PROGRAMMING ENVIRONMENT

CROSS REFERENCE TO RELATED APPLICATIONS

This application claims the benefit of U.S. Provisional Application No. 60/830,162, filed Jul. 10, 2006, which is a continuation-in-part of U.S. application Ser. No. 11/301,482, filed Dec. 12, 2005, both of which are incorporated by reference in their entireties.

BACKGROUND

1. Field of the Art

An embodiment of this invention is in the field of memory management specialized in a multi-thread programming environment. The target programming system is System C which is based on C++ programming language system.

2. Description of the Related Art

Existing systems create a thread using a biased stack frame, and a shared pointer mechanism. Many existing multi-processor systems cannot appropriately create and manage threads. A multi-processor system cannot use one or more extra CPUs for thread execution, if it only has a single location for the stack space for multiple threads. Also, the speed of context switching between threads is slow when the stack size becomes large.

SUMMARY

As described herein, preferred embodiments of the invention performs at least the following methods:

1) Method to create a new thread of execution by creating a stack space in a heap area and by using that fixed size area as a stack space for the thread. (Note that this is the same mechanism as other thread implementation, e.g. quick thread.)

2) Method to create a copy of a thread by copying the stack frame of current thread, and by storing the location of the original stack frame address and all the necessary register values into a memory area.

3) Method to create a thread by identifying the original location of the stack frame, saving the contents in the location to another memory area, then copying the saved stack frame image back to the exact location of the memory space, and recovering all the registers.

4) In the stack allocation mechanism, the method that allocated stack area is always aligned with the page boundary of the virtual memory management mechanism.

5) Given method described in 4), the save and copy stack operation described in 3) uses the method to swap the page location of two stack spaces allocation in two virtual memory space by just modifying the page mapping table, without physical memory copy.

6) Method to create a copy of thread by creating the same execution image from a program execution point where the thread generation function is called, and identifying if the thread is a newly created one from the return value of the thread generation function.

An embodiment of the invention allows the user to write a dynamic thread program with a Unix process-fork style programming interface that is a very common multi-process programming in Unix.

With this method and system, only copied threads share the same stack location for execution, so unrelated thread have individual stack space and can be executed concurrently in multi-processor system.

Also, the copy operation of the stack frame is only necessary among the copied threads, so the speed of context switching among individual threads in fast. This operation can be a simple page table modification in the virtual memory management mechanism for further speed up.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The pictures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Discussion

The web document "implementing a thread library on linux" by Evan Jones (http://evanjones.ca/software/threading.html), which is herein incorporated by reference, provides basic explanations for process, thread, and user space thread. Embodiments of the invention implement the user-space thread as explained in the document, but use an additional mechanism to create and execute a copy of a thread.

Here, the thread generation mechanism is explained with a generic CPU architecture with a stack pointer (SP), a function frame pointer (FP), and a continuous stack space. Various CPU architectures have various sets of registers, but most of those are using the same scheme for processing the execution of a program, and this generic mechanism can be easily mapped to any particular CPU architectures.

Usage of Addressing Space for Program Execution

Figure 1:
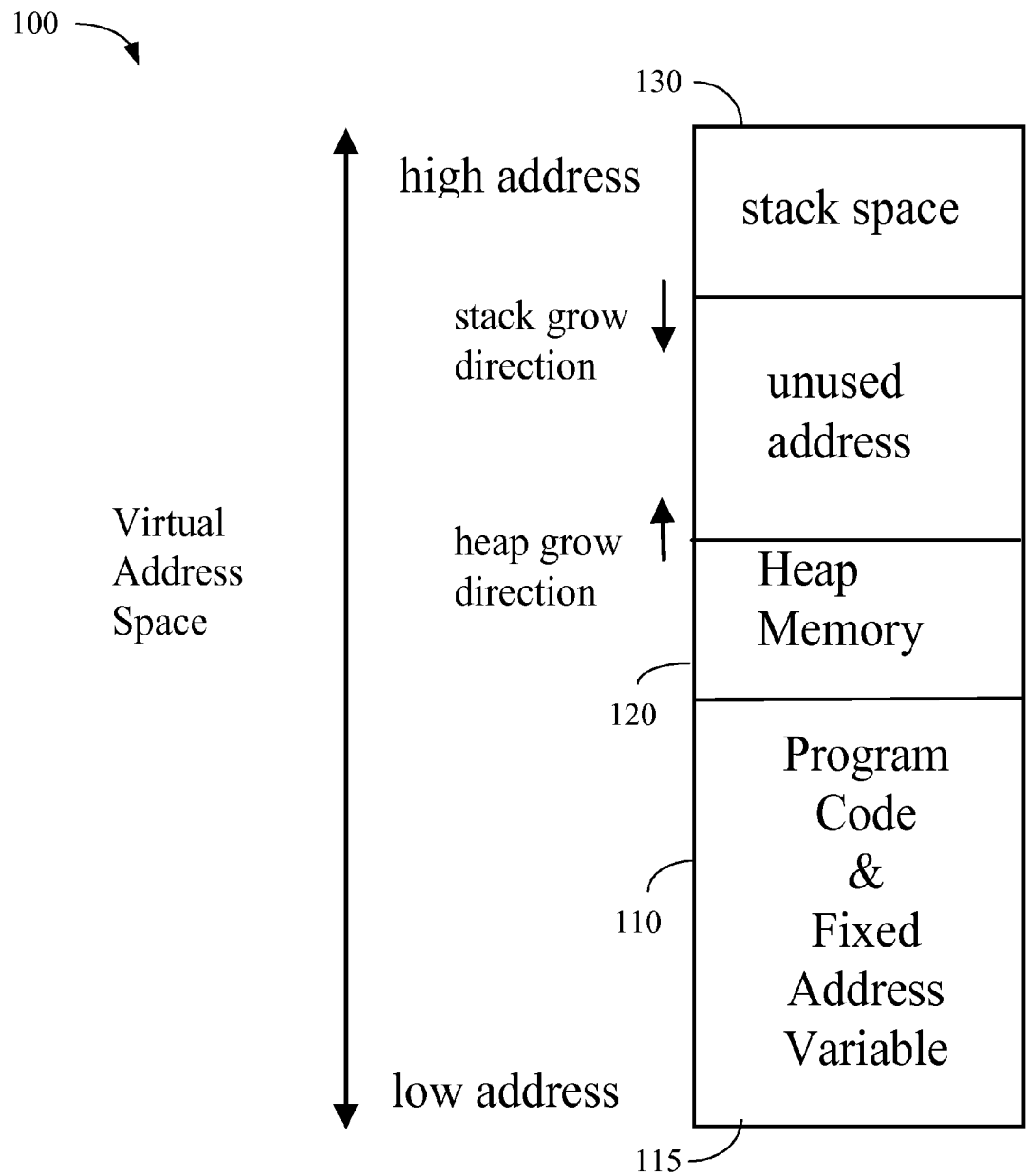
FIG. 1 shows an example of memory space.

FIG. 1 shows the execution of a user program managed by a typical operating system 100. Such a system is done with three types of memory spaces. The program code and fixed address variables 110 (global variables, static variables) are located at the bottom 115 of the address space. The heap memory space 120 is located next to it. The heap memory space is used to allocate memory dynamically along with the program requests such as malloc( ), free( ) system calls. The heap can grow toward a higher address. The stack space 130 is allocated at the top of the addressing space, and growing toward the bottom. Thus, if there's only one execution thread, the stack space 130 can grow until it hits an upper bound of the heap space.

Function Call Mechanism

Figure 2:
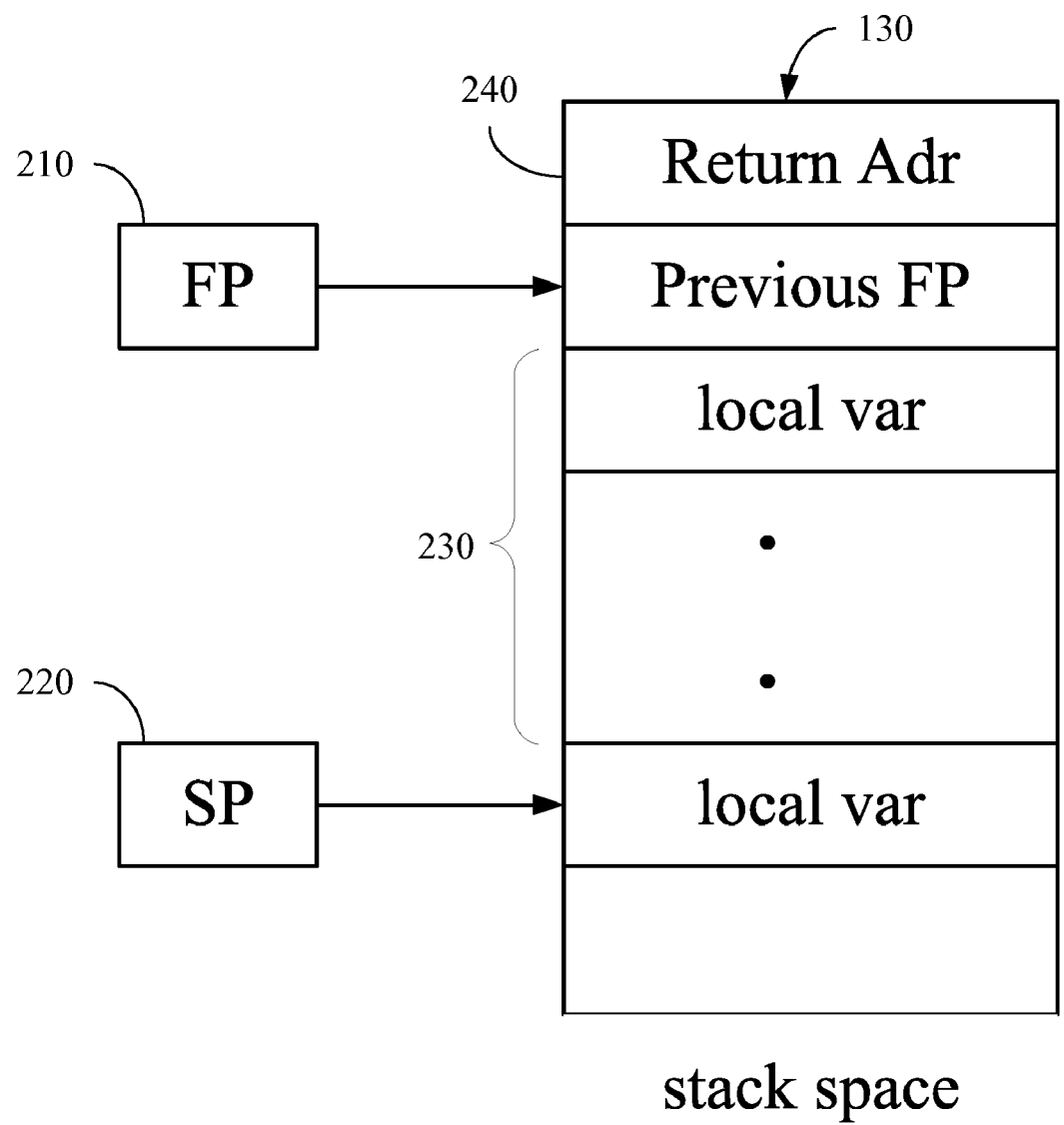
FIG. 2 shows a frame pointer register (FP) and a stack pointer register (SP) accessing a stack space allocates a structure that contains the pointer to the object, as well as the reference counter.

As shown in FIG. 2, when a function is called, a CPU (and corresponding compiler) uses one register as a frame pointer (FP) 210 to identify the local variable boundary for the function call. The stack pointer (SP) register 220 points to the end of stack, and the local variables 230 are located between FP and SP. The return address 240 of the function is placed before the FP, and the previous FP value is saved in the stack where the FP register is pointing to.

In FIG. 2, the stack 100 is growing from top to bottom, and SP points to the last valid entry on the stack space. FP points to the start point of the local variable, and the previous FP value is saved at the stack pointed to by FP itself.

In such an execution model of the software (which is common to most of CPU architectures), returning from a function is done as:

SP=FP; // copy FP to SP
FP=Stack[SP-]; // pop operation from the stack, recover the previous FP value
PC=Stack[SP-]; // pop return address to Program Counter Existing Thread Implementation In order to implement multiple threads, multiple images of such stack space must be created. One implementation has such thread stacks 150, 160 in the heap memory. In this mechanism, a piece of memory is allocated from the heap space 120 as a thread stack. Initially, a program is executed with the main stack space as explained, but once a thread is created and the execution is transferred, the stack space is actually located in the heap 120 as shown in FIG. 3.

Figure 3:
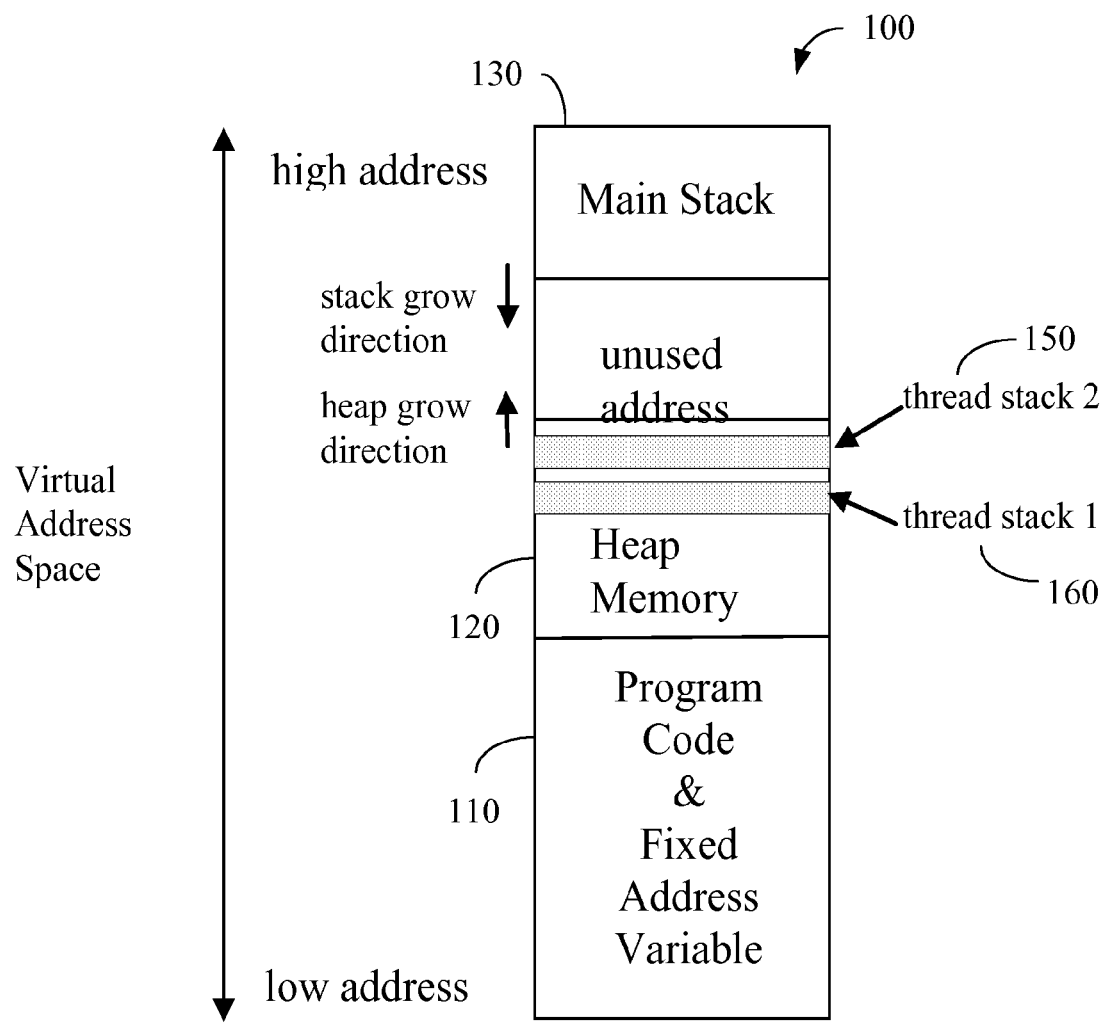
FIG. 3 shows multiple images of the stack stored in a heap memory.
Figure 4:
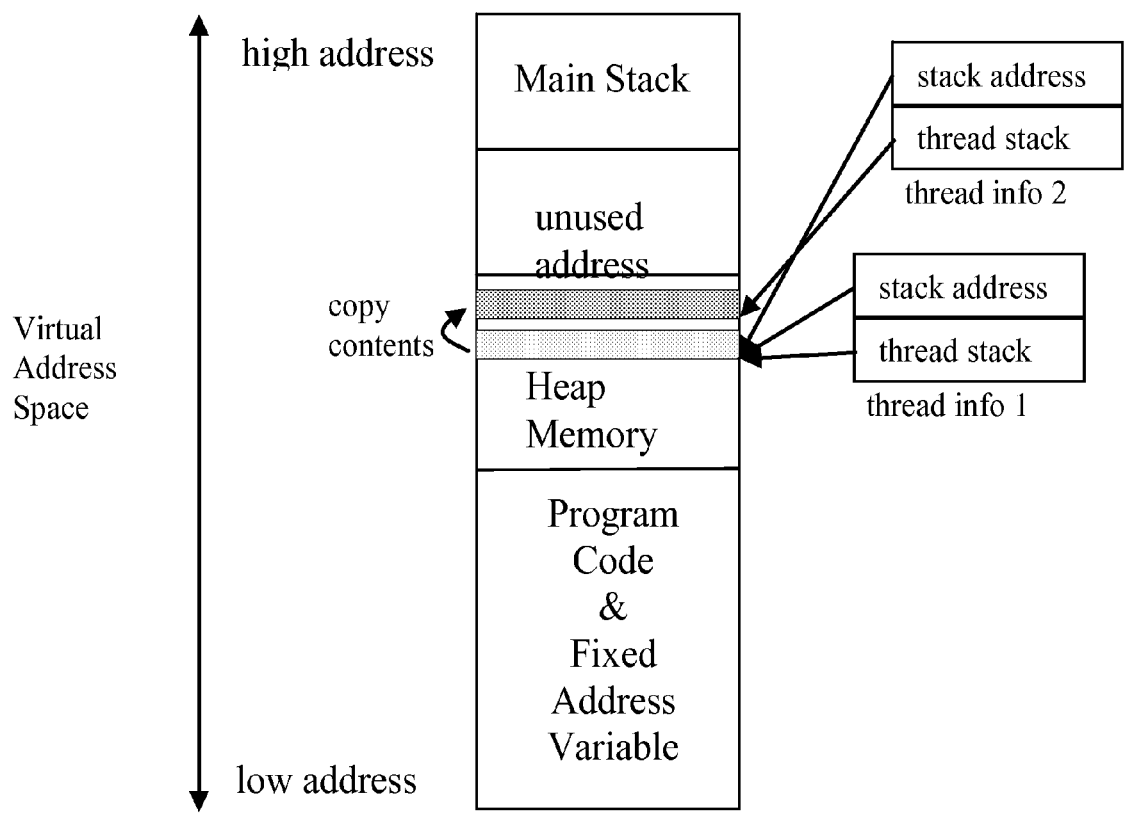
FIG. 4 shows an example of memory in accordance with a preferred embodiment of the invention.

The stack space 130 of FIG. 3 has a fixed size, and cannot be extended when it reaches the end. One implementation solves this problem by using an extended stack space as the thread stack. But this mechanism requires that there is only one active thread that uses the stack space.

One implementation solves this particular limitation of the thread creation mechanism, and it has the stack size limitation as the ordinal thread mechanism.

The particular limitation of an existing thread mechanism is that a new thread can only be started at the beginning of a function. A simple example is:

```
void foo( ) {
    // thread function beginning
    ..
}
void main( ) {
    ..
    // creating a thread
    create_thread( foo, .. );   // give a function entry
                                // as the beginning of thread
    ..
```

In the code above, the function 'foo( )' is executed as a new thread. The function address is given to the thread create function 'create_thread'.

This programming interface is not common in programming languages that support dynamic concurrency (e.g., Jeda, Vera, System Verilog). In those languages, a copy of an execution image within a function can be created.

For example, a thread can be created with a fork-join pair in Jeda as:

```
void main( ) {
    ..
    // creating a thread
    fork
    {
        // body of thread 1 code
        ..
    }
    join_none
    ..
```

The statements within a fork-join pair are executed concurrently as threads. In the code above, the code block encapsulated with { } pair is executed as a thread. It uses 'join_none' at the end, which means that the main code is executed without waiting the completion of the thread code. If 'join' is used instead, the main execution will wait for the completion of the child threads.

Another common concurrent programming interface is a 'fork' system call in the Unix operating system. With the fork( ) system call, the operating system creates identical execution images, and returns the new process ID to the parent, and zero to the child. The following code shows the example. The major difference in this is that this 'fork( )' system call generated a copy of process, not a thread. This means that the copy of entire virtual space will be created, and run as different programs in the system. So it cannot be used directly for this thread programming.

```
if( fork ( ) == 0 ) {
    // child process
    ..
}
else {
    // parent process
    ..
}
```

The advantage of having this style of thread generation is that it can share the local variable. Thus, various parameters can be transferred through the local variables. When the function call style thread creation is used, passing an argument to the function is not simple. A current SystemC standard uses a mechanism called 'bind', that creates an object image of function call that contains the function address as well as arguments. (The detailed information about bind is found in 'www.boost.org/libs/bind/bind.html', which is herein incorporated by reference.) The problem of using such mechanism is that the created image may possibly reference the local variable in the code that creates the thread. But when the thread is started, the parent code may not be active (exits from the function call), and the corresponding local variable may not be valid. Thus, a SystemC standard passes a constant argument to the thread. This is not a totally desirable mechanism for thread generation.

The Thread Generation Mechanism in an Embodiment

The thread stack in an embodiment the invention uses the memory space in heap space 120 as an ordinal user thread mechanism. When a thread is created, a piece of memory is allocated as a stack space for the thread, which is the same way as the ordinal SystemC thread generation.

When the thread code requests that a copy of the thread itself be generated, another piece of memory is allocated in the heap area, and the contents of stack space of the requesting thread are copied there. The necessary register values such as stack pointer and frame pointer are also saved. It also stores the information of the original stack location that indicates that the stack must be actually the specific location to execute the newly copied thread.

When a thread is started and it has the thread stack address different from the actual stack space, the contents in the target stack area is saved to another area, and modifies the thread information that point to the new stack space. Then the content of the new thread stack space is copied to the target stack address, and the new thread is executed.

Note that this copy operation is only necessary when the thread stack space and the target stack address are different. If a thread does not have a copy, or the same thread are using the common thread stack, the copy operation is not necessary.

Also, the operating system can support a mechanism to swap two pages in a virtual address mapping, the stack can be allocated at the boundary of page, and the system uses the swap mechanism instead of physically copying the contents. This can speed up the context switching.

The Thread Generation from a Function Address

Figure 5:
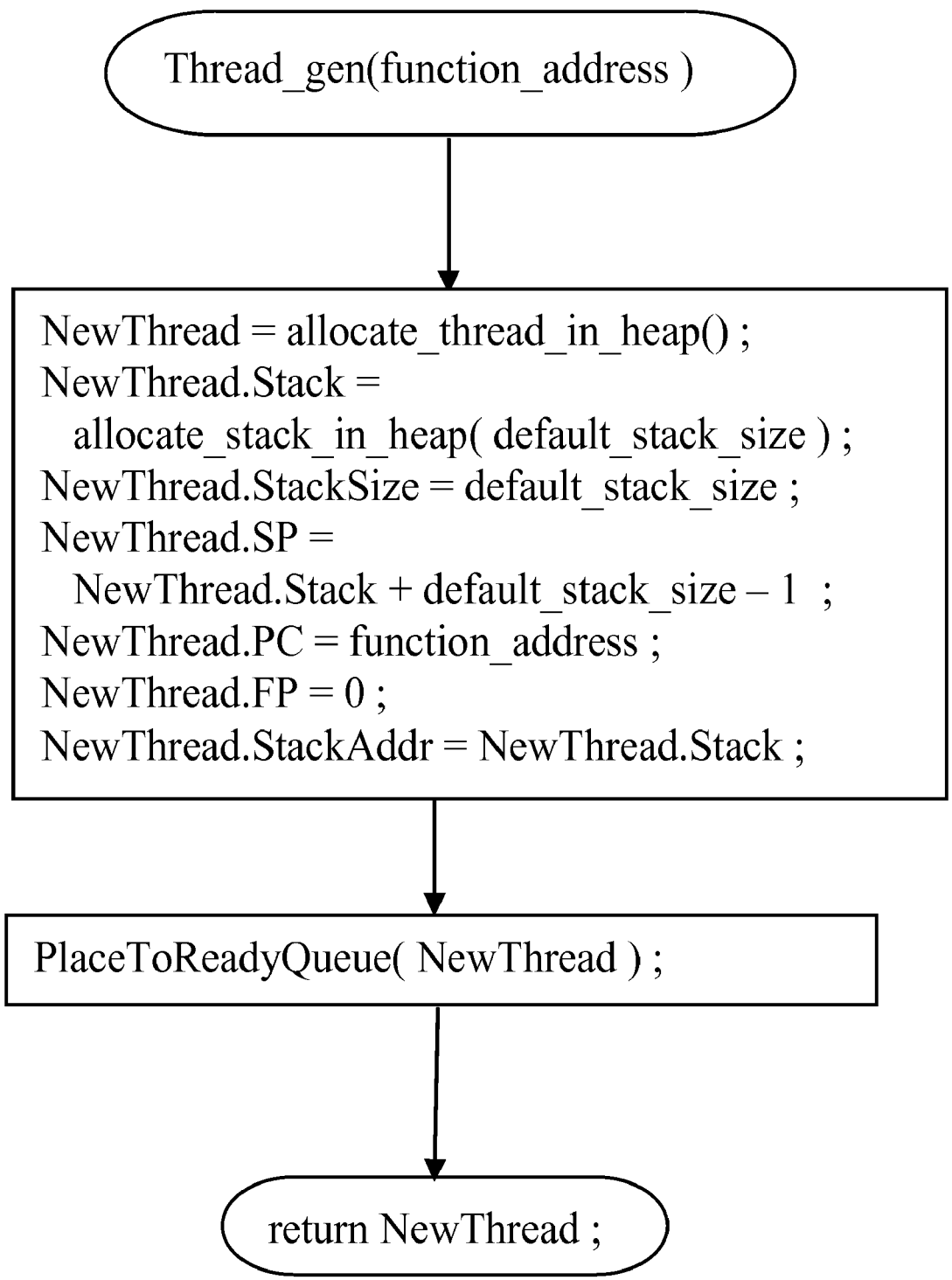
FIG. 5 is a flowchart of new thread generation.

In general concurrent programming, a thread is created as the execution image that starts from the beginning of a function. The flowchart of FIG. 5 shows the mechanism of a new thread generation from a function address. In this case, the new thread carries its own stack space in the heap. The structure NewThread is allocated in the heap, and holds the necessary information to execute the thread. In the thread structure, 'SP' holds the stack pointer which is set to the top of stack area, 'PC' holds the address of execution which is set to the function_addr passed as an argument of the function, 'FP' holds the frame pointer register value which is set to zero, 'Stack' holds the new space allocated as the stack space for this thread, 'StackSize' holds the size of stack space, and 'StackAddr' holds the actual stack address which is the same as the 'Stack'. A default stack size is used as the fixed stack space size for a thread. The stack pointer is set to the last address of allocated 'Stack' space, assuming that stack pointer is grow downwards.

The Thread Copy Generation Mechanism of an Embodiment of the Invention

An embodiment of the invention allows creation of a copy of the thread execution image, instead of the beginning of a function to start a thread. The programming interface to generate a copy of a thread can be similar to the process generation system call in the Unix system. When it called, it creates a copy of the current execution image, returns the new thread ID to its parent, and returns 0 (zero) to the newly created thread. Thus, by testing the return value of the thread generation function, the program knows if it's a parent or a child. The following code shows the example of thread copy generation.

```
void foo( ) {
    ..
    // creating a copy of thread
    if( copy_thread( ) == 0 )
    {
        // code for child thread
        ..
    }
    else {
        // code for parent thread
        ..
    }
}
```

The thread copy generation function 'copy_thread( )' allocates a new copy area in the heap, and generates a copy of the current thread by copying the stack frame and necessary register values. In order to indicate that this thread stack must be on the stack address of the current stack, StackAddress is set to the current thread Stack space. Then 0 (zero) is set as the return value (usually done by one of the registers) to the generated copy. This new thread is placed in the ready queue for a thread scheduler so that it will be executed. Then the system returns to the parent (caller of copy_thread( )) with the new thread ID (this could be a pointer to the thread info). When the new thread is executed, the exact copy of stack image is restored to the same address space in the current thread stack area after the current thread space will be saved to another area, and it receives 0 (zero) as the return value from the thread generation function.

In order to implement the copy of thread, it is necessary to allocate the stack space to the same address range as the original. This is because most CPU architectures define temporal registers to keep any value for optimization. These registers are not destructed for function call (values are saved and restored by callee function). Thus, some registers can hold a pointer to a stack space. Usually, it is not possible to know if such a register holds a pointer to a local variable as it depends on the compiler, the optimization level, etc. Thus, to maintain the same execution image, we have to save such register values as is, and maintain the addressing space for the stack. Such a mechanism cannot be provided if the stack area for a thread is allocated in the heap area without the special stack map mechanism.

The following flowchart shows the execution of the copy_thread function.

The copy of the execution image of the current thread is created to a NewThread structure. The register value of 'AR' is set to zero, which will be used as the return value from the function. The current thread stack is also copied to a memory space, that is pointed to by the Stack pointer, and StackAddr is set to the address of the current stack address that is different from the memory space pointed by the Stack pointer. Then this structure is registered to be ready in the thread scheduler.

Figure 6:
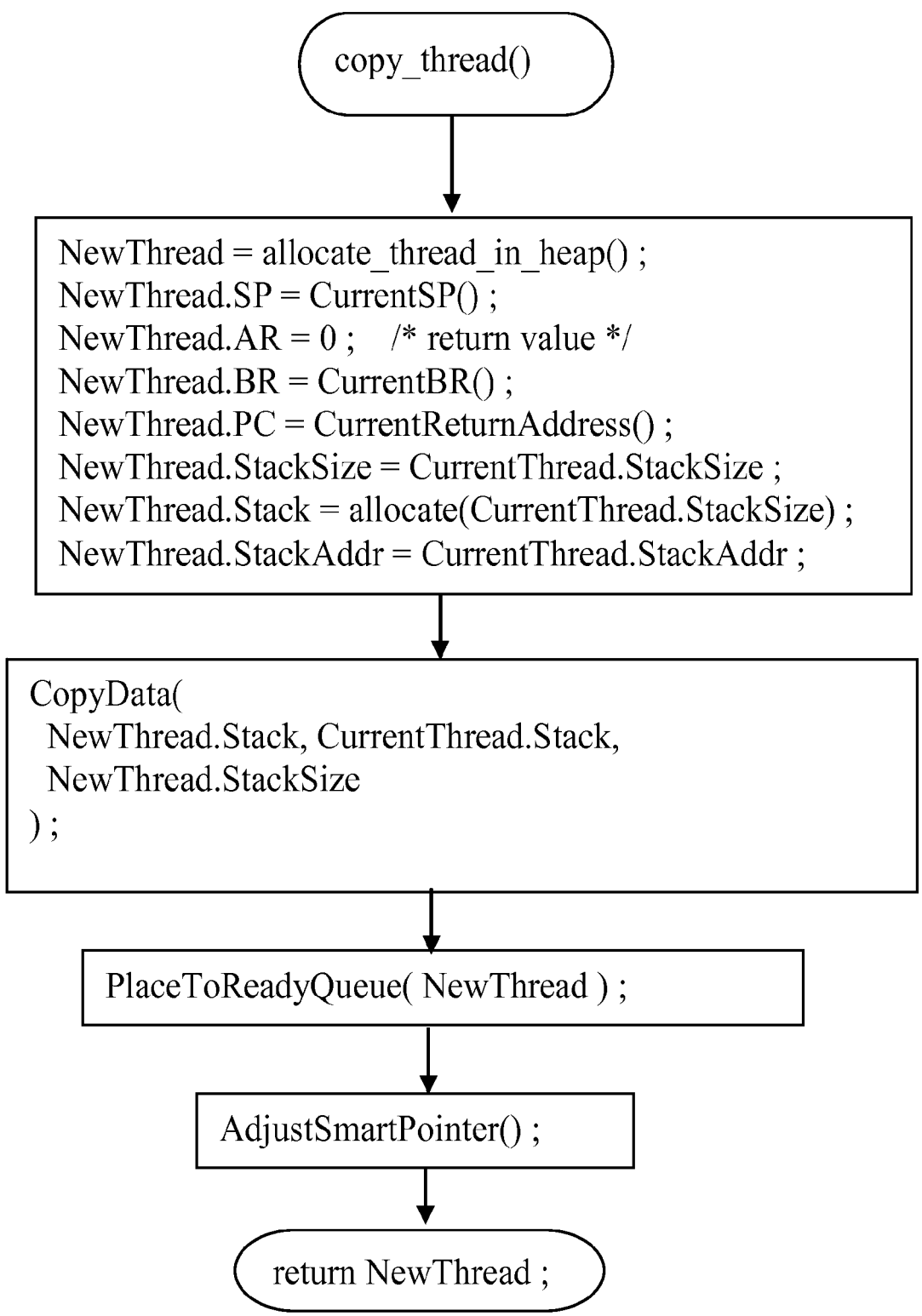
FIG. 6 is a flowchart of execution of a copy_thread function.

The last box in FIG. 6 calls a function AdjustSmartPointer( ). The exact same mechanism can be applied to this new mechanism of creating a copy of a thread.

The function returns the address of the thread structure, to tell the caller that the execution is for the parent thread.

When the newly created thread is executed, its AR register is set to be zero, and that represents the return value from the copy_thread function, and tells the caller that the execution is for a child thread.

The Context Switching Mechanism of an Embodiment

Figure 7:
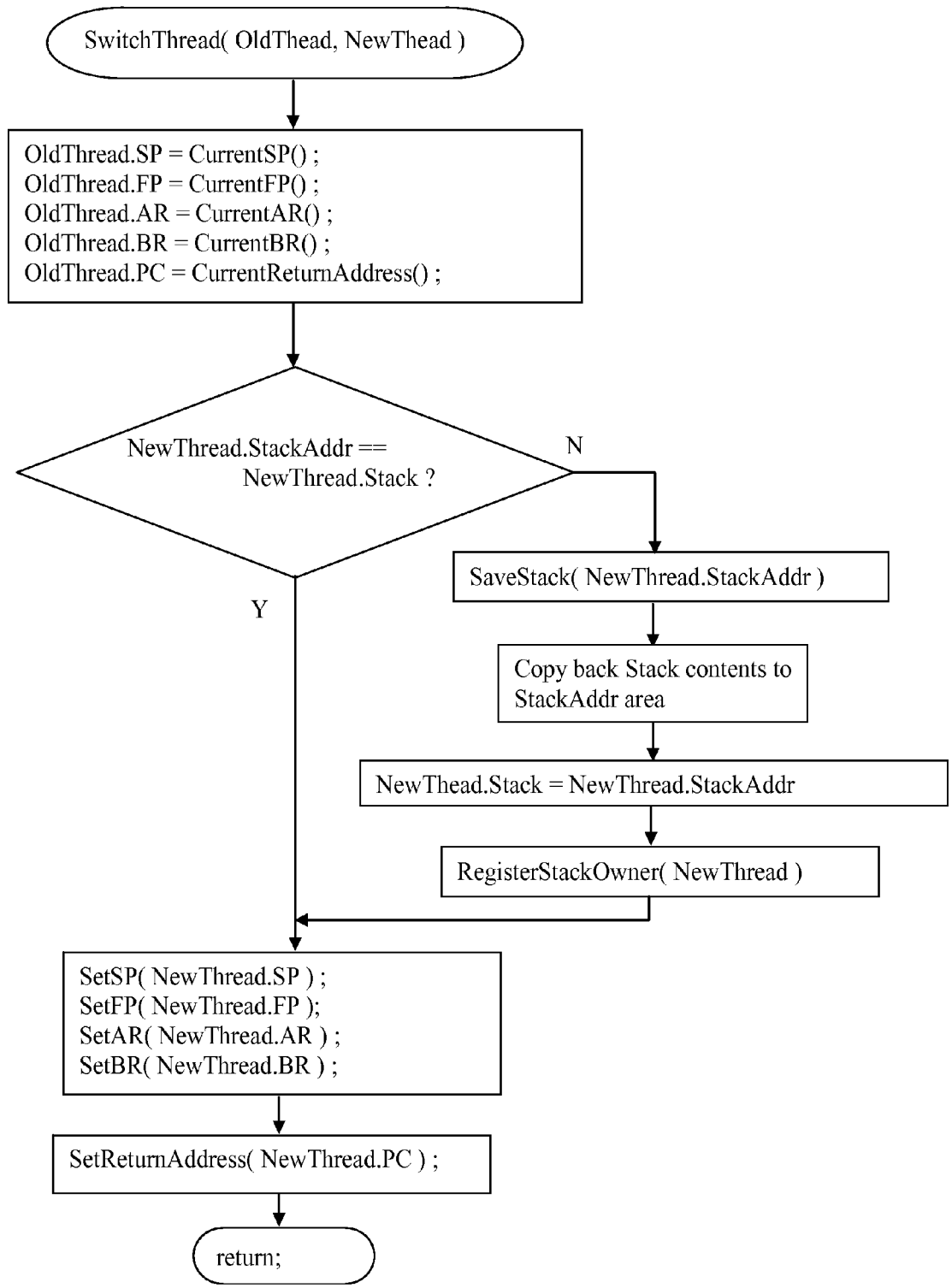
FIG. 7 is a flowchart of context switching between threads.
Figure 8:
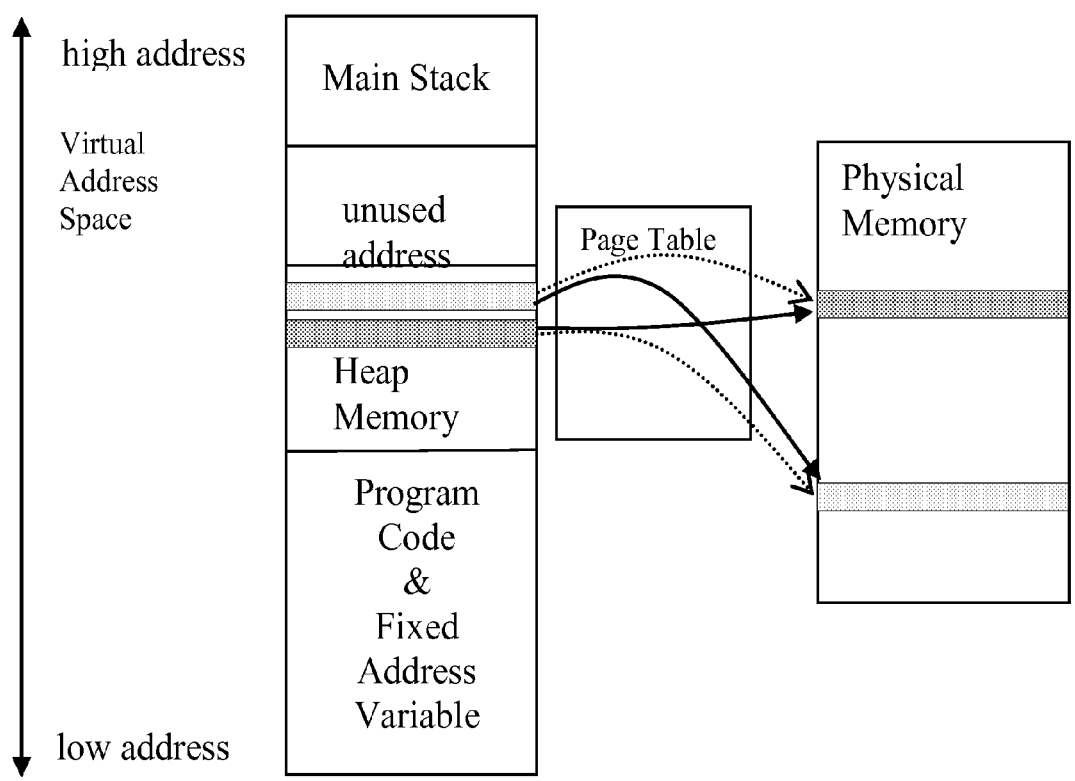
FIG. 8 is shows an example of memory space in accordance to an embodiment of the present invention.

With the thread structure explained above, context switching between threads are done by the flowchart of FIG. 7. In one embodiment, the method of FIG. 7 is called from the thread scheduler to switch the thread context.

In the first box in the flowchart, the register values and return address which is read from the stack frame is saved to the OldThread structure. Here we assumes there's two general purpose registers AR and BR to be kept the original values. So, the values of those registers are saved to the structure. Then, it is ready for the new thread execution. It checks if Stack and StackAddr is the same, and when it finds they are different, then the following steps are taken. First, it create the copy of the stack area pointed by the Stack pointerAddr, and stored the copy to 'Stack' in the thread structure of the owner thread. This part is assumed to be done in a subroutine 'SaveStack( )' in the chart. Then the contents of Stack is copied into the SaveStack area, and Stack is pointed to the StackAddr to indicate that this thread is using the space. The function RegisterStackOwner is called to record the information of the thread as the owner of the stack space. This information is used within the function SaveStack( ) when the stack information must be saved.

Then, various register values from the NewThread structure are restored.

In the last box, the PC value is stored into the corresponding return address area in the stack frame, so that returning from this function will transfer the control to the new thread.

If the values of Stack and StackAddr are the same, then the stack frame copy is not necessary, and there's no performance impact.

Save and Copy Stack Operation Using a Page Table

The memory images shown herein are all user execution images. In modern operating systems (for example, Linux or Windows), the actual memory mapping to the physical memory is managed by the operating system. In order to do address translation, the computer system uses a page table mechanism that converts the user space address to the system physical address. The user memory addresses are split into pages and each page can be mapped to different physical addresses via address translation hardware. If the thread stack is aligned to the page boundary, the SaveStack operation and the copy stack operation to switch the thread context can be performed by the translation table. As shown in the figure below, two page tables can be swapped in the virtual address space by just modifying the page table. Before the operation, the page table has the dotted line to map the virtual page to physical memory. After the page table update, the solid line is used for the address translation. By using this mechanism, there's no memory copy operation, and the thread context swapping performed faster.

The Smart Pointer

A smart pointer mechanism of U.S. patent application Ser. No. 11/301,482 can be applied to this new thread implementation without modification in one embodiment.

While the present invention has been described with reference to certain preferred embodiments, those skilled in the art will recognize that various modifications may be provided.

Variations upon and modifications to the preferred embodiments are provided for by the present invention.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for thread creation in an object-oriented programming environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of creating software threads in a data processing system having a memory, comprising:
    establishing a main stack in the memory;
    establishing a thread stack in the memory by creating a stack space in a heap area and by using a fixed size area as a stack space for the thread;
    creating a copy of a thread by copying the stack frame of current thread, and by storing a location of the original stack frame address and register values into a memory area; and
    executing a thread by identifying an original location of the stack frame, saving the contents in the original location to another memory area, copying the saved stack frame image back to the exact location of the memory space, and recovering the registers.

2. The method of claim 1, wherein the saving and copying comprises modifying the page mapping table, without physical memory copying.

3. The method of claim 1, further comprising:
    creating a copy of thread by creating the same execution image from a program execution point where a thread generation function is called; and
    identifying if the thread is a newly created one from the return value of the thread generation function.

* * * * *